(12) United States Patent
Roy et al.

(10) Patent No.: US 10,274,625 B2
(45) Date of Patent: Apr. 30, 2019

(54) SYSTEM AND METHOD FOR POROSITY ESTIMATION IN LOW-POROSITY SUBSURFACE RESERVOIRS

(71) Applicant: CHEVRON U.S.A. INC., San Ramon, CA (US)

(72) Inventors: Prasenjit Roy, Katy, TX (US); Donna J. Venable, Houston, TX (US); William Savran, San Diego, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 171 days.

(21) Appl. No.: 15/346,824

(22) Filed: Nov. 9, 2016

(65) Prior Publication Data

US 2018/0128929 A1     May 10, 2018

(51) Int. Cl.
*G01V 1/28*     (2006.01)
*G01V 1/30*     (2006.01)

(52) U.S. Cl.
CPC .............. *G01V 1/306* (2013.01); *G01V 1/282* (2013.01); *G01V 2210/614* (2013.01); *G01V 2210/6244* (2013.01)

(58) Field of Classification Search
CPC ................................ G01V 1/306; G01V 1/282
USPC ...................................................... 702/12, 14
See application file for complete search history.

(56) References Cited

U.S. PATENT DOCUMENTS

| | | | |
|---|---|---|---|
| 7,286,939 B2 | 10/2007 | Bachrach et al. | |
| 7,752,022 B2 | 7/2010 | Fornel et al. | |
| 7,869,955 B2 | 1/2011 | Zhang et al. | |
| 8,392,165 B2 | 3/2013 | Craig et al. | |
| 8,838,425 B2 | 9/2014 | Zhang et al. | |
| 8,874,419 B2 | 10/2014 | Da Veiga et al. | |
| 8,886,502 B2 | 11/2014 | Walters et al. | |
| 2008/0221800 A1* | 9/2008 | Gladkikh | G01V 3/32 702/11 |
| 2010/0312534 A1* | 12/2010 | Xu | G01V 1/50 703/2 |
| 2012/0281883 A1 | 11/2012 | Hurley et al. | |
| 2013/0229892 A1* | 9/2013 | Skjei | G01V 1/282 367/73 |
| 2015/0120197 A1* | 4/2015 | Xu | G01V 1/50 702/14 |
| 2016/0109593 A1* | 4/2016 | Saxena | G01V 1/306 702/16 |

* cited by examiner

*Primary Examiner* — Eman A Alkafawi
(74) *Attorney, Agent, or Firm* — Marie L. Clapp

(57) ABSTRACT

A method is described for porosity mapping of low porosity subsurface reservoirs using seismic data and well logs. The method may compute dry-frame rock properties using fluid substitution modeling based on the well log data; perform porosity expansion of the dry-frame rock properties based on rock physics to generate expanded rock properties; generate synthetic seismic data based on the expanded rock properties; calibrate the seismic dataset with the synthetic seismic data; generate an estimated porosity map based on the calibrated seismic dataset and the synthetic seismic data; and identify geologic features based on the estimated porosity map. The method may be executed by a computer system.

7 Claims, 6 Drawing Sheets

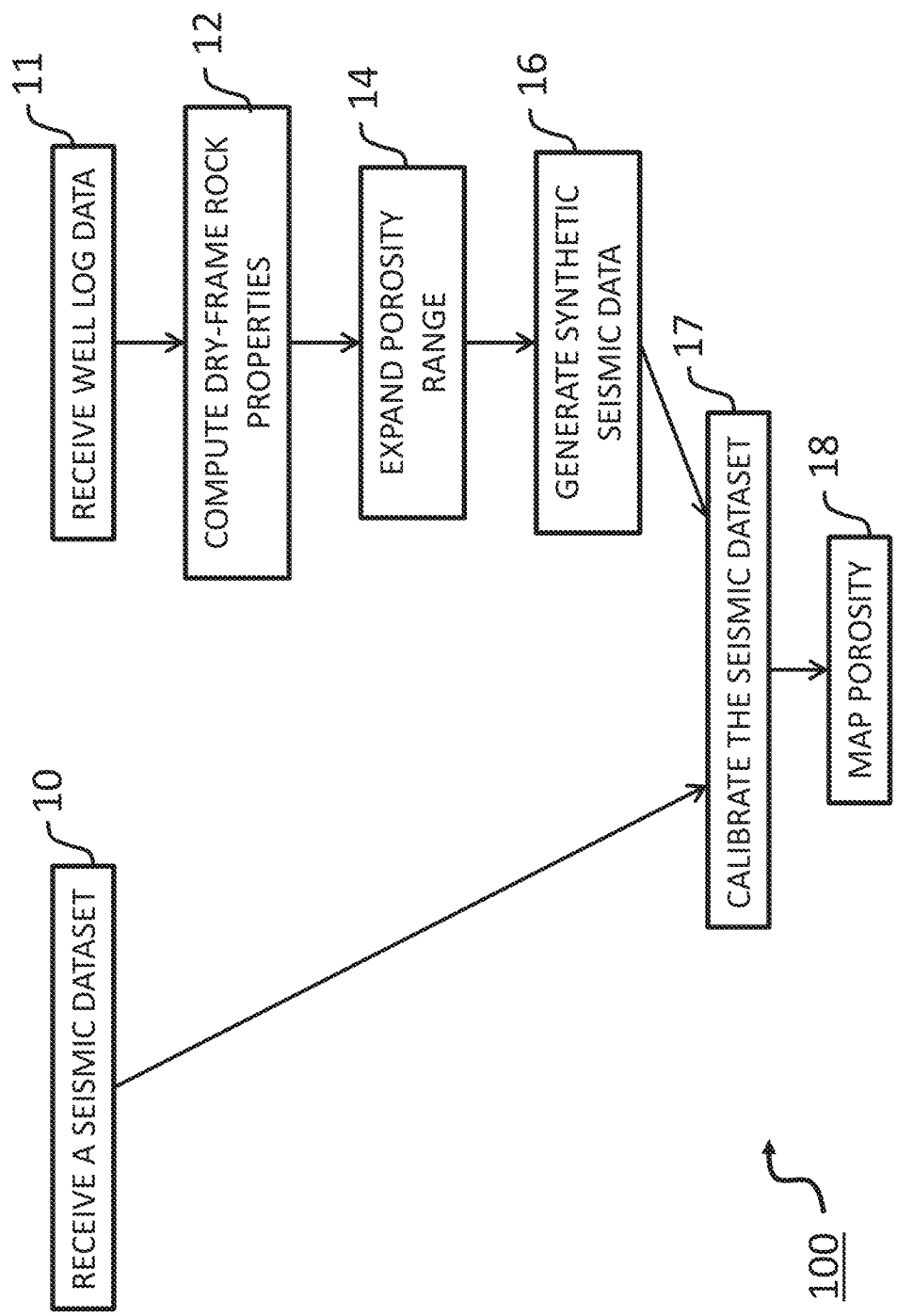

SYSTEM AND METHOD FOR POROSITY ESTIMATION IN LOW-POROSITY SUBSURFACE RESERVOIRS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to techniques for estimating porosity in subsurface reservoirs and, in particular, to methods of estimating porosity in low-porosity reservoirs based on petrophysical analysis, seismic data, and probabilistic modeling.

BACKGROUND

Exploration for and production of hydrocarbons in subterranean reservoirs is a highly technical and expensive undertaking. Even in areas with existing wells that can provide direct data about the subsurface, understanding the reservoir properties away from the well locations is difficult. Additionally, the data from the well locations may not be completely representative of the entire subsurface volume due to the natural variation of the rock.

Understanding the areal distribution of porosity in subsurface reservoirs is important for calculating potential hydrocarbon content and production expectations. Although methods exist to estimate porosity based on seismic impedance, these methods perform poorly in so-called unconventional reservoirs, which have low porosity due to the type of rock (e.g. shale, carbonates).

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors. The amplitude of the seismic response varies with offset (the distance from the source to the sensors) (AVO) and reflection angle (AVA). Conventional methods for predicting subsurface properties based on AVA, such as U.S. Pat. No. 7,869,955, require well log data either from numerous drilled wells or pseudo-wells. In many areas there are few drilled wells and pseudo-wells may not be representative of the entire subsurface volume of interest, particularly in low-porosity reservoirs.

The ability to estimate porosity in the subsurface and, by extension, the location of rock and fluid property changes in the subsurface is crucial to our ability to make the most appropriate choices for purchasing materials, operating safely, and successfully completing projects. Project cost is dependent upon accurate prediction of the physical geologic properties within the Earth. Decisions include but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for improved porosity estimation in low-porosity hydrocarbon reservoirs, allowing more accurate porosity mapping to facilitate exploration for and production of hydrocarbons.

SUMMARY

In accordance with some embodiments, a method of porosity mapping of low-porosity reservoirs may include receiving, at a computer processor, a seismic dataset and well log data representative of a subsurface volume of interest; computing dry-frame rock properties using fluid substitution modeling based on the well log data; performing porosity expansion of the dry-frame rock properties based on rock physics to generate expanded rock properties; generating synthetic seismic data based on the expanded rock properties; calibrating the seismic dataset with the synthetic seismic data; generating an estimated porosity map based on the calibrated seismic dataset and the synthetic seismic data; and identifying geologic features based on the estimated porosity map.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

FIG. 1 illustrates a flowchart of a method of porosity mapping, in accordance with some embodiments;

DETAILED DESCRIPTION OF EMBODIMENTS

Figure 2A:
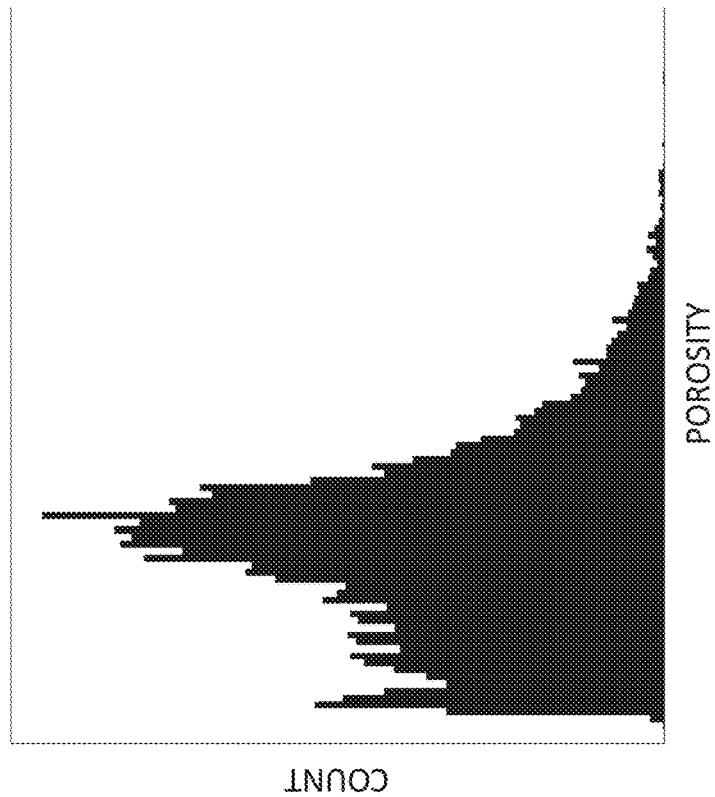
FIGS. 2A and 2B illustrate a step of a method of porosity mapping, in accordance with some embodiments.

Described below are methods, systems, and computer readable storage media that provide a manner of porosity mapping. These embodiments are designed to be of particular use for porosity mapping of subsurface volumes with low porosity.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

The present invention includes embodiments of a method and system for porosity mapping of low-porosity hydrocarbon reservoirs.

FIG. 1 illustrates a flowchart of a method 100 for porosity mapping of a low-porosity subsurface volume of interest. At operation 10, a seismic dataset is received. As previously described, the seismic dataset includes a plurality of traces recorded at a plurality of seismic sensors. This dataset may have already been subjected to a number of seismic processing steps, such as deghosting, multiple removal, spectral shaping, and the like. These examples are not meant to be limiting. Those of skill in the art will appreciate that there are a number of useful seismic processing steps that may be applied to seismic data before it is deemed ready for imaging.

At operation 11, the well log data are received. These well log data are subjected to petrophysical analysis to provide compressional and sonic velocity, density, total porosity, total water saturation, matrix bulk modulus, matrix shear modulus, pressure, temperature, gas gravity, oil gravity, and formation water salinity. The petrophysical analysis may be done, for example, as a MultiMin analysis using Paradigm's Geolog MultiMin to compute mineral volumes, porosity, and water saturation. The input petrophysical properties are very important for accurately computing dry frame moduli for the measured logs.

The results of the petrophysical analysis of the well log data are used to compute dry-frame rock properties 12 using Gassmann fluid substitution. This may be done using the following equations:

$$K_{dry} = \frac{K_{sat}\left(\frac{\phi K_0}{K_{fl}} + 1 - \phi\right) - K_0}{\frac{\phi K_0}{K_{fl}} + \frac{K_{sat}}{K_0} - 1 - \phi}$$

$$\mu_{dry} = \mu_{sat}$$

$$\rho_m = \frac{\rho_{sat} - \rho_{fl}\phi}{1 - \phi}$$

$K_{sat}$: saturated bulk modulus computed from Vp,Vs, and density curves of the analog well data
$K_0$: Hashin—Shtrikman or Voigt—Reuss average mineral bulk modulus
$K_{fl}$: Fluid bulk modulus
$\mu_{sat}$: saturated shear modulus computed from Vs, and density curves of the analog well data
$\rho_{sat}$: saturated reservoir density from Density curve of the analog well data
$\rho_{fl}$: saturated fluid density
$\emptyset$: Reservoir porosity from porosity curve of the analog well data The accurate calculation of $K_{dry}$ is necessary to properly estimate reservoir porosities using Gassmann fluid substitution in unconventional reservoirs. First, the method estimates the elastic moduli for each constituent mineral determined from the petrophysical analysis of the well log data and combines them using Hashin-Shtrikman or Voigt-Reuss averaging. The minerals' bulk moduli are calculated by analyzing cross-plots between bulk modulus and porosity for data points that contain a sufficient amount of the mineral of interest. By way of example and not limitation, a mineral content of 70% may be used. The mineral bulk modulus may be interpreted as the zero porosity value of the least-squares fit to bulk modulus and porosity. Once the bulk moduli are calculated for all minerals, $K_0$ is calculated by averaging the mineral bulk modulus using Hashin-Shtrikman or Voigt-Reuss averages.

The porosity data from the petrophysical analysis represent discrete data points from wells. This sampling is insufficient to represent all possibilities found in a given area so, referring again to FIG. 1, operation 14 expands the porosity range to encompass porosities likely to be found in the subsurface away from the existing wells. Porosity expansion is performed on the computed dry frame moduli to broaden the distribution at discretely sampled intervals. A rock physics model is used to calculate dry frame bulk and shear modulus, and density set for the expanded porosity point that is consistent with observed measured data. This may be done using the following equations:

$$K_{dry_i} = K_0(1 - \phi_i/\phi_c)f^{\phi_i/\phi}; f = \frac{K_{dry}/K_0}{(1 - \phi/\phi_c)}$$

$$\mu_{dry_i} = \mu_0(1 - \phi_i/\phi_c)g^{\phi_i/\phi}; g = \frac{\mu_{dry}/\mu_0}{(1 - \phi/\phi_c)}$$

Figure 2B:
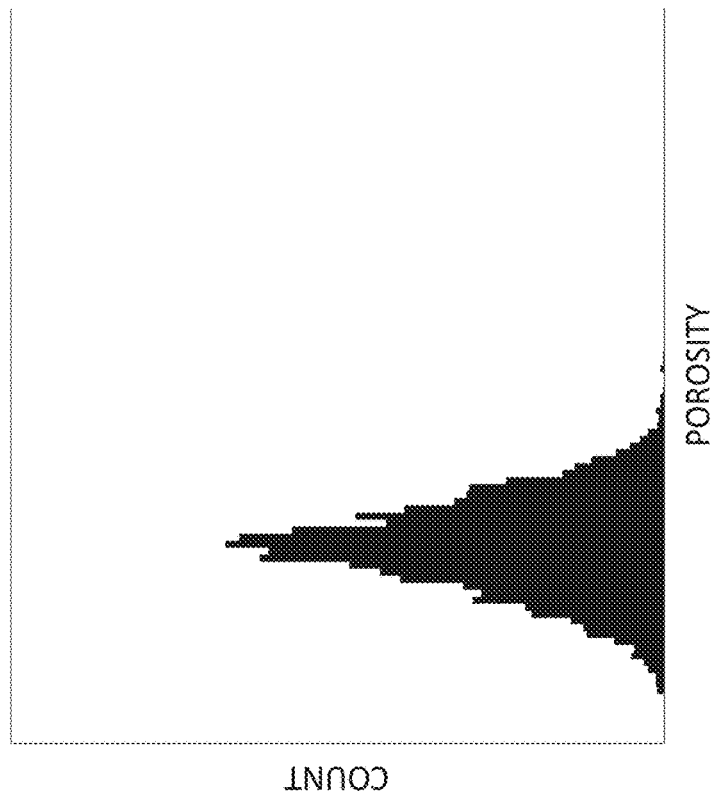

$\emptyset_i$: $\emptyset \pm \Delta\emptyset$ (additional porosity points)
$\emptyset_c$: Critical Porosity
$\mu_0$: Hashin—Shtrikman or Voigt—Reuss average mineral shear modulus The porosity expanded dry frame moduli are then fluid substituted back to in situ saturation. This is illustrated in FIGS. 2A and 2B, where FIG. 2A shows the porosity distribution from the petrophysical analysis and FIG. 2B shows the porosity range after the expansion.

Figure 3:
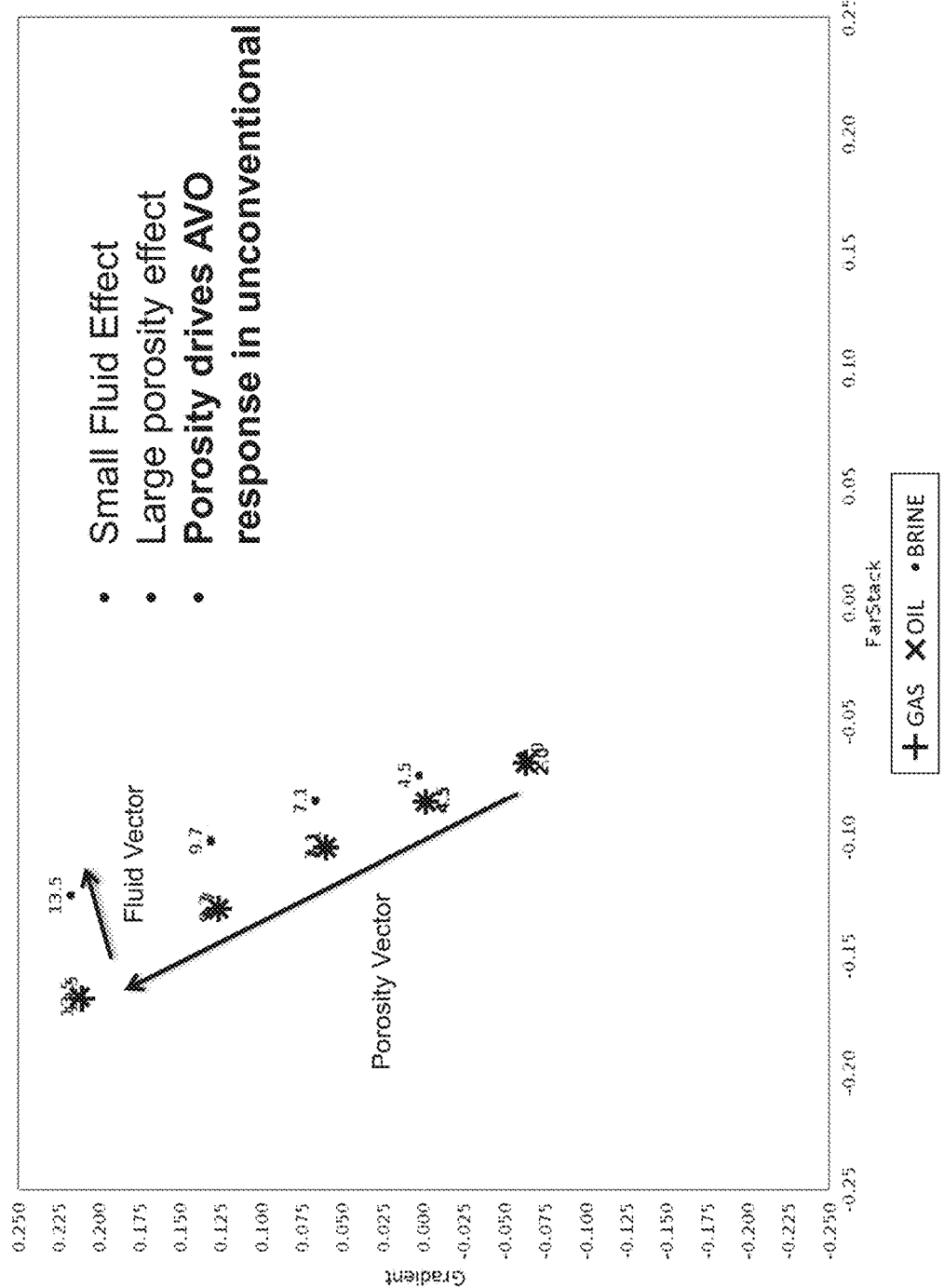
FIG. 3 illustrates another step of a method of porosity mapping, in accordance with some embodiments.

Referring again to FIG. 1, the expanded porosity range is used to generate synthetic seismic data 16, particularly the amplitude-versus-angle (AVA) response. The porosity-expanded dataset is used for generating multiple AVA synthetics for a range of expected shale thicknesses based on input from geologist over the expected porosity distribution. An example of the synthetic AVA responses can be seen in FIG. 3. FIG. 3 shows the crossplot of the calculated synthetic seismic far-stack amplitudes versus the gradient of the synthetic seismic amplitudes as they change with angle for a variety of porosities. The magnitude of amplitude change due to porosity far exceeds any change due to changes in reservoir fluid type (wet, oil, or gas). This phenomenon observed in tight (i.e., low porosity) reservoir rocks makes it possible to infer porosity from seismic data as the seismic amplitude is most sensitive to porosity change. The present methodology ensures that a broader distribution of porosities is included and therefore models a range of seismic amplitudes that otherwise will be limited by porosities based on well penetrations.

The next step is to compare recorded seismic amplitude extracted on a seismic horizon with the synthetic seismic amplitudes and make inference on porosity based on similarity of seismic amplitudes with synthetic seismic. As the recorded seismic amplitudes have different scaling with respect to synthetic seismic amplitudes, the recorded seismic amplitude need to be calibrated so that the recorded seismic and synthetic seismic amplitudes have similar range of amplitudes, which is done in operation 17 of FIG. 1. For calibration, a non-reservoir shale region (background region) is identified in the seismic horizon map based on knowledge about local geology. The amplitude statistics from this region (P20 and P80 seismic) will be compared with modeled synthetic amplitudes (P20 and P80 synthetic) for non-reservoir shale for deriving the calibration scalar using the following expression:

$$\text{Scalar} = \frac{P80_{synthetic} - P20_{synthetic}}{P80_{seismic} - P20_{seismic}}$$

Figure 4:
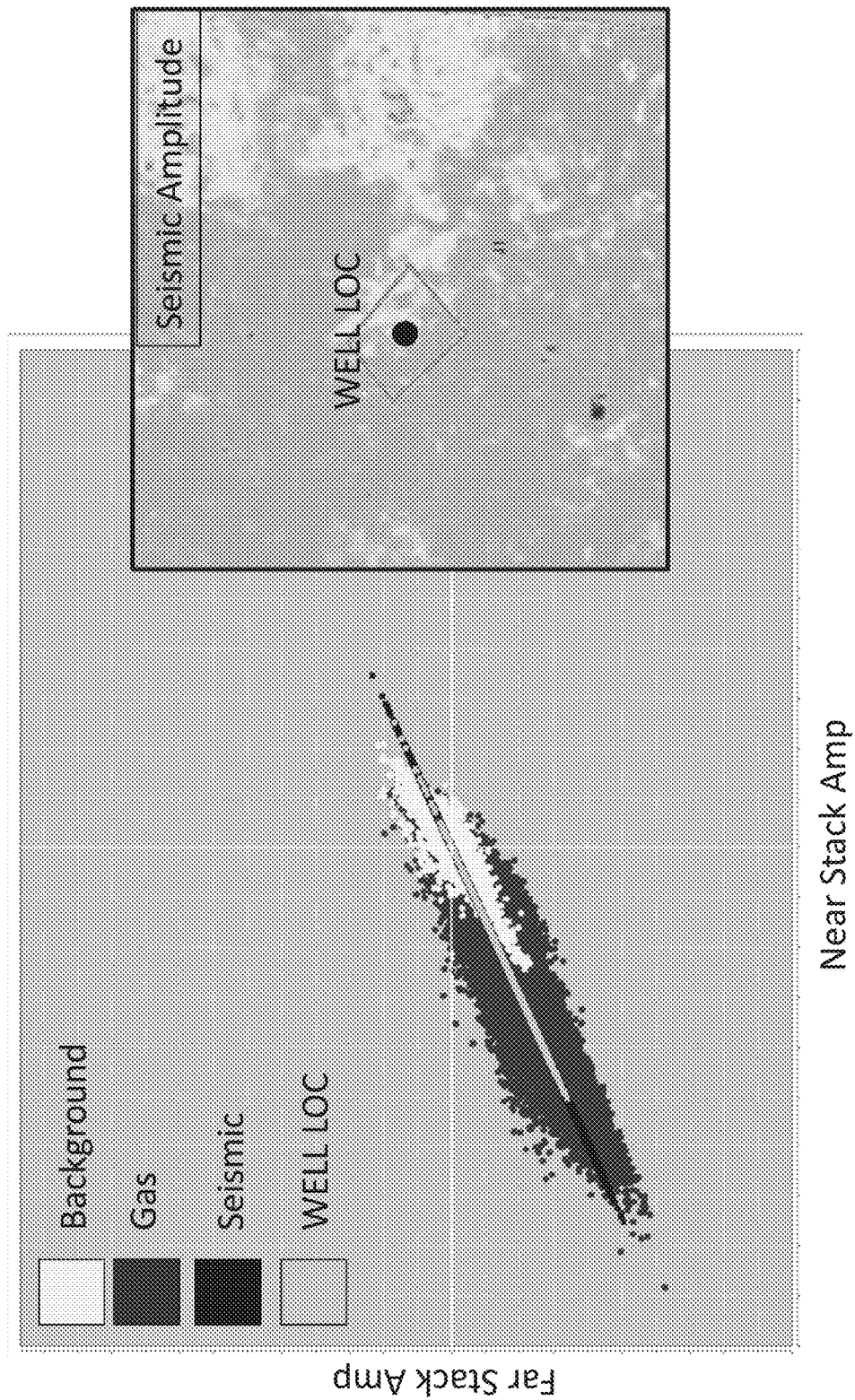
FIG. 4 illustrates a step of a method of porosity mapping, in accordance with some embodiments.

The scalar is then multiplied to the recorded seismic amplitude as demonstrated by FIG. 4, which shows the recorded seismic amplitudes are plotted together with synthetic amplitudes based on data from well location.

After the calibration step, the method 100 in FIG. 1 continues to mapping porosity 18 along seismic horizons. Bayesian analysis is used for the comparison and to map porosity distribution from the seismic data.

$$P(porosity|seismic) = \frac{P(seismic|porosity) \times P(porosity)}{P(seismic)}$$

P(porosity seismic): calculated porosity at each seismic map location for generating the porosity map.
P(seismic porosity): This term is calculated by binning the seismic cross plot (FIG. 4) based on U.S. Pat. No. 7,869,955.
P(porosity): prior porosity which is based on geological knowledge.
P(seismic): This is a normalization term; may be set to 1.

Figure 5:
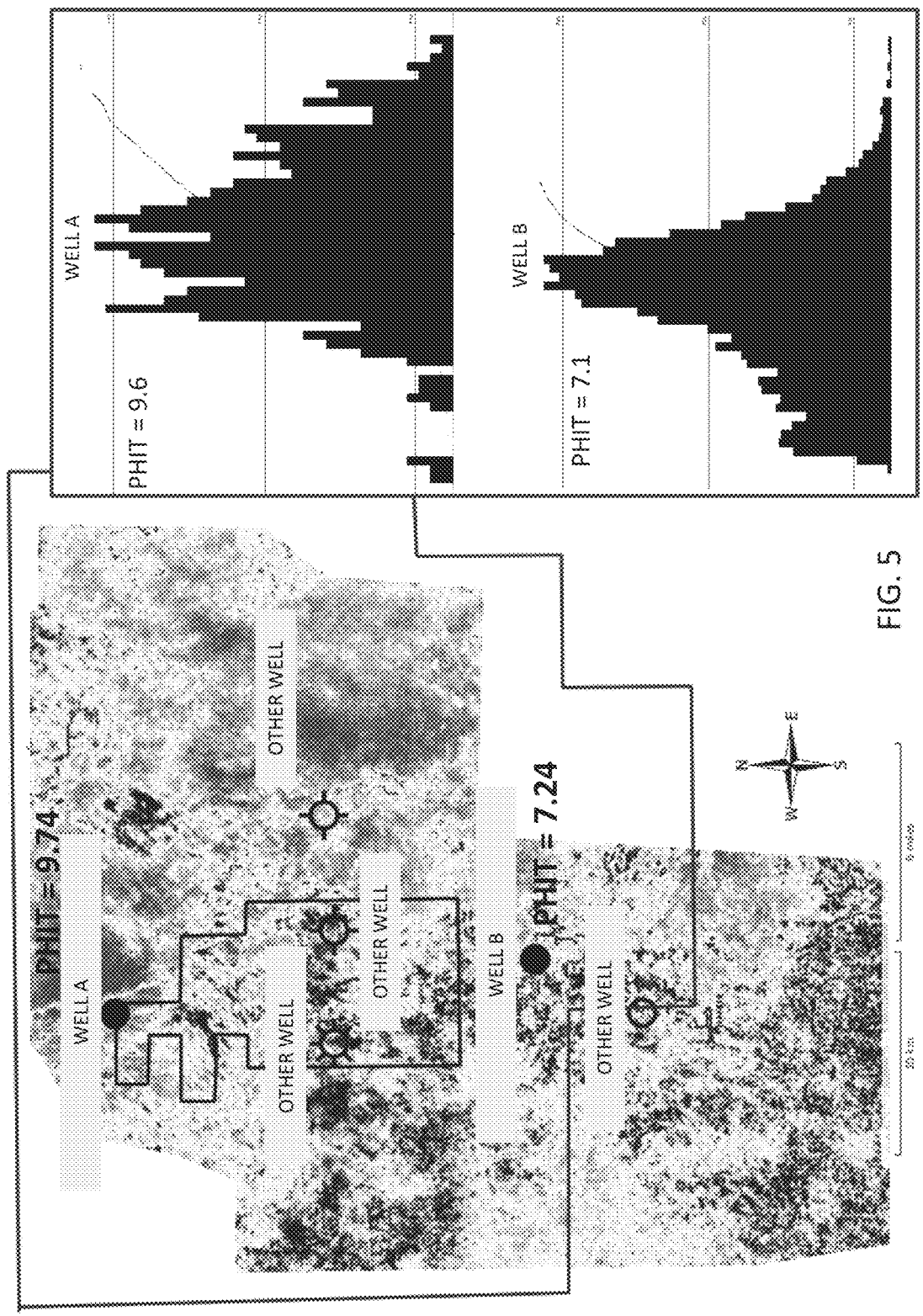
FIG. 5 illustrates a result of a method of porosity mapping, in accordance with some embodiments

FIG. 5 shows a computed porosity map using method 100 with six wells indicated. On the right, porosity distribution of two wells (Well A and Well B) is shown. The porosity map computed using the present methodology correctly estimates average porosity for these two locations, confirming the validity of the present method.

Figure 6:
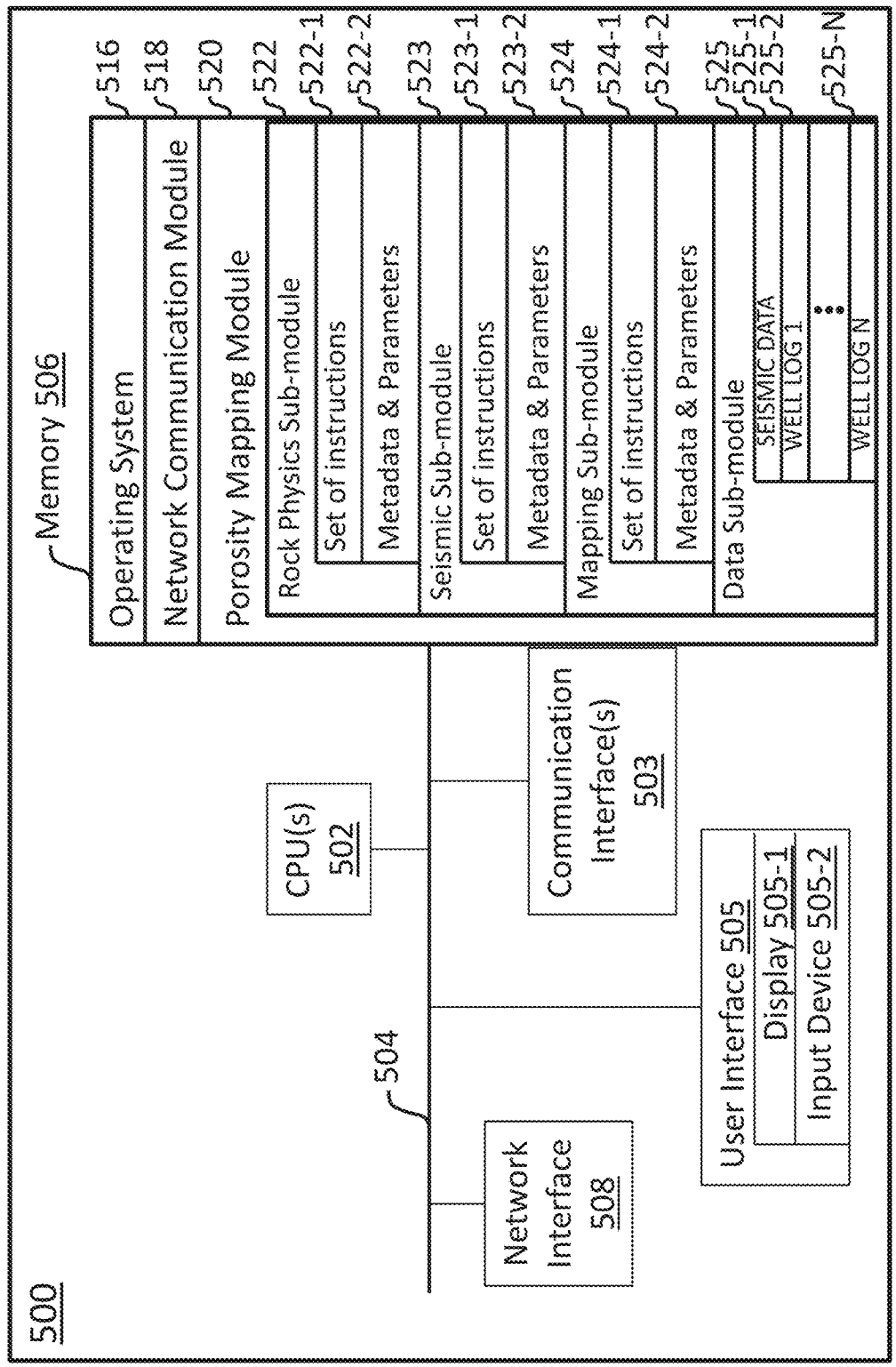
FIG. 6 is a block diagram illustrating a porosity mapping system, in accordance with some embodiments.

FIG. 6 is a block diagram illustrating a porosity mapping system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the porosity mapping system 500 includes one or more processing units (CPUs) 502, one or more network interfaces 508 and/or other communications interfaces 503, memory 506, and one or more communication buses 504 for interconnecting these and various other components. The porosity mapping system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a porosity mapping module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the porosity mapping module 520 executes the operations of method 100. Porosity mapping module 520 may include data sub-module 525, which handles the seismic dataset 525-1 and well logs 525-2 through 525-N. This data is supplied by data sub-module 525 to other sub-modules.

Rock physics sub-module 522 contains a set of instructions 522-1 and accepts metadata and parameters 522-2 that will enable it to execute, for example, operations 12 and 14 of method 100. The seismic sub-module 523 contains a set of instructions 523-1 and accepts metadata and parameters 532-2 that will enable it to execute, for example, operations 16 and 17 of method 100. The mapping sub-module 524 contains a set of instructions 524-1 and accepts metadata and parameters 524-2 that will enable it to execute at least operation 18 of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the seismic data, well logs, or porosity map may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 5) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of porosity mapping, comprising:
    a. receiving, at a computer processor, a seismic dataset and well log data representative of a subsurface volume of interest;
    b. computing dry-frame rock properties using fluid substitution modeling based on the well log data;
    c. performing porosity expansion of the dry-frame rock properties based on rock physics to generate expanded rock properties;
    d. generating synthetic seismic data based on the expanded rock properties;
    e. calibrating the seismic dataset with the synthetic seismic data;
    f. generating an estimated porosity map based on the calibrated seismic dataset and the synthetic seismic data; and
    g. identifying geologic features based on the estimated porosity map.

2. The method of claim 1 wherein the subsurface volume of interest contains a low porosity hydrocarbon reservoir.

3. The method of claim 1 wherein the computing dry-frame rock properties comprises:
    a. estimating an elastic modulus for each constituent mineral determined from the well log data;
    b. combining the elastic moduli for each constituent mineral using Hashin-Shtrikman or Voigt-Reuss averaging;
    c. calculating a bulk modulus for each constituent mineral by analyzing cross-plots between bulk modulus and porosity for well log data points that contain at least 70% of the constituent mineral; and
    d. calculating an average mineral bulk modulus by averaging the bulk moduli using Hashin-Shtrikman or Voigt-Reuss averages.

4. The method of claim 1 wherein the performing porosity expansion is based on a critical porosity model.

5. The method of claim 1 wherein the generating synthetic seismic data is done for a plurality of shale thicknesses.

6. A computer system, comprising:
    one or more processors;
    memory; and
    one or more programs, wherein the one or more programs are stored in the memory and configured to be executed by the one or more processors, the one or more programs including instructions that when executed by the one or more processors cause the device to:
    a. receive a seismic dataset and well log data representative of a subsurface volume of interest;
    b. compute dry-frame rock properties using fluid substitution modeling based on the well log data;
    c. perform porosity expansion of the dry-frame rock properties based on rock physics to generate expanded rock properties;
    d. generate synthetic seismic data based on the expanded rock properties;
    e. calibrate the seismic dataset with the synthetic seismic data;

f. generate an estimated porosity map based on the calibrated seismic dataset and the synthetic seismic data; and g. identify geologic features based on the estimated porosity map.

7. A non-transitory computer readable storage medium storing one or more programs, the one or more programs comprising instructions, which when executed by an electronic device with one or more processors and memory, cause the device to a. receive a seismic dataset and well log data representative of a subsurface volume of interest;

b. compute dry-frame rock properties using fluid substitution modeling based on the well log data;

c. perform porosity expansion of the dry-frame rock properties based on rock physics to generate expanded rock properties;

d. generate synthetic seismic data based on the expanded rock properties;

e. calibrate the seismic dataset with the synthetic seismic data;

f. generate an estimated porosity map based on the calibrated seismic dataset and the synthetic seismic data; and g. identify geologic features based on the estimated porosity map.

\* \* \* \* \*